Aug. 4, 1936.  G. A. LYON  2,049,460
TIRE COVER AND SUPPORT THEREFOR
Filed April 30, 1934   3 Sheets—Sheet 1
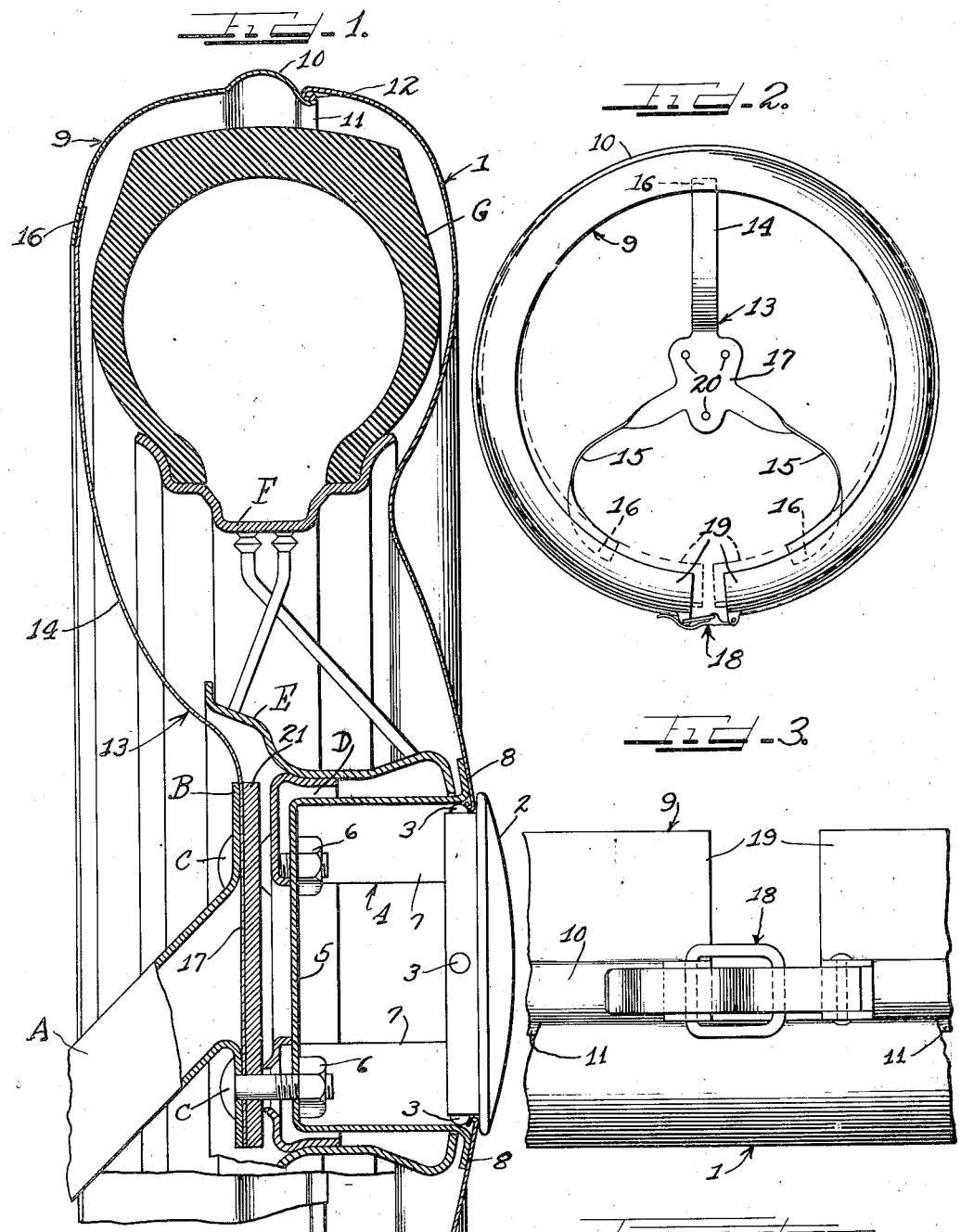
Inventor
George Albert Lyon.
By Charles W. Hills Attys.

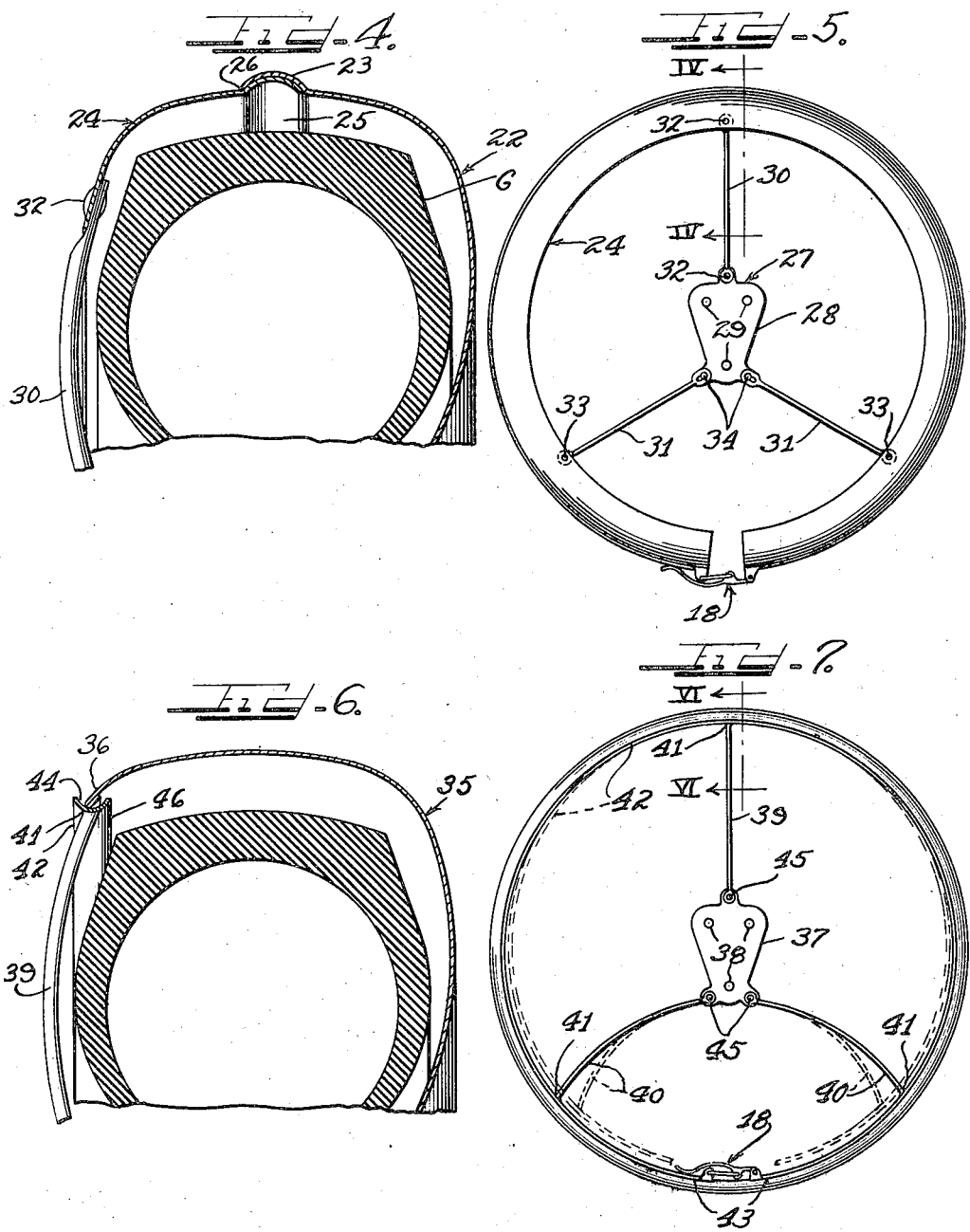

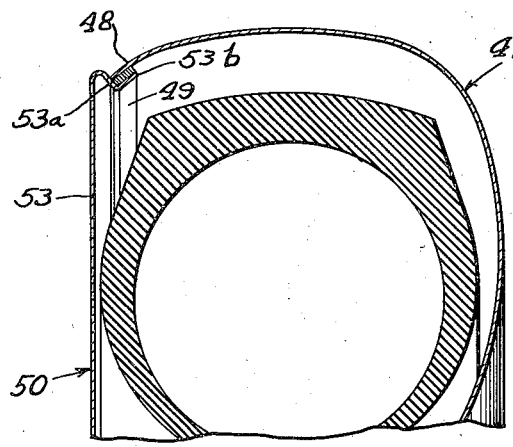
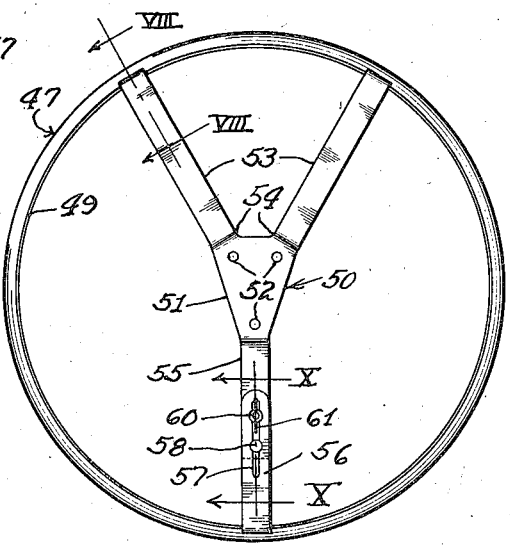
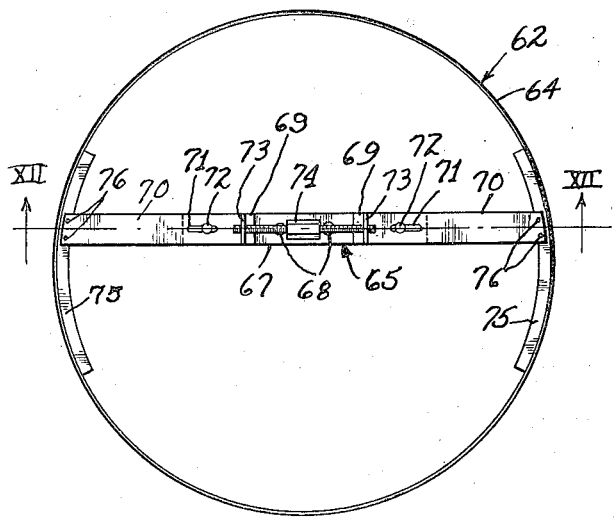
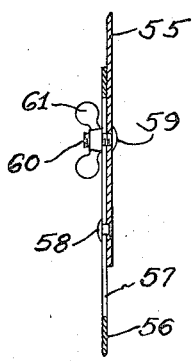
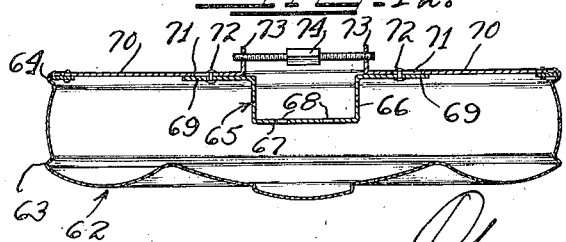

Patented Aug. 4, 1936

2,049,460

UNITED STATES PATENT OFFICE 2,049,460

TIRE COVER AND SUPPORT THEREFOR

George Albert Lyon, Detroit, Mich., assignor to Lyon Incorporated, Detroit, Mich., a corporation of Delaware Application April 30, 1934, Serial No. 723,048

17 Claims. (Cl. 150—54)

This invention has to do with tire covers, and is concerned more particularly with a tire cover construction embodying an expansible and contractible member which may be expanded to support a cover in proper tire protecting position.

It is an object of this invention to provide complementary tire cover members, one of which is mounted on the means for carrying the spare wheel, and so constructed as to be inherently contractible to be separated from the other member and to be forcibly expanded to be interlocked with said other member.

It is another object of the invention to provide an expansible and contractible tire cover member with means whereby the same may be substantially rigidly supported from the spare wheel carrier, the cover member being such as to be normally contracted and to be forcibly expanded into interlocking relationship with another cover member.

A further object of the invention resides in the provision of means for firmly securing a cover member by the means employed in mounting a spare wheel and a complementary tire cover member, the members being provided with means adapted to interlock when one of the members is expanded.

A further object of the invention resides in the provision of a substantially rigid tire cover member arranged to cover the front and tread of a tire, and in supporting means constructed to be adjusted so as to releasably support the cover member independently of the tire.

In accordance with the general features of one form of the invention, there is provided a front cover member arranged to cover the front and extend over a part of the tread of the tire, and a second cover member arranged to cover the remaining portion of the tread of the tire and to fit within the tread covering margin of the front cover member. The second member is split and preferably resilient and supported from the spare wheel carrier, and any suitable means such as toggle mechanism is provided on the second member to expand the same into interlocking relationship to the first member. The second member is mounted on the carrier so as to flex without disturbing its connection with the carrier.

In accordance with another form of the invention, one cover member is provided, the same extending preferably over the entire tread of the tire, and an expansible and supporting ring arranged to receive the rear edge of the cover member is mounted on the carrier in such a manner as to be forcibly expanded into interlocking and consequently supporting relationship to the cover member, and to be released to contract by reason of its own resiliency to release the front cover member so that the same may be removed and applied.

In accordance with a still further form of the invention, a construction similar to that referred to in the last previous paragraph is provided, except that the mounting means comprises a spider having a radially adjustable arm, all of the arms of the spider being interlockable into engagement with cover members of various sizes.

Another form of the invention involves the provision of a construction similar to that referred to in the last previous paragraph except that it embodies a substantially straight bar to which interlocking elements are adjustably connected to be forced into and withdrawn from interlocking relationship with the cover member.

With any of these constructions, it is evident that the cover structure is extremely simple, involving a minimum of parts which are readily manipulated to enable the cover to be applied to and removed from proper covering relation to the spare wheel and tire, and in which the manipulating mechanism is in an inconspicuous place or entirely concealed when the cover is viewed from the front thereof.

Further objects and advantages of the invention will appear as the description proceeds.

This invention (in preferred forms) is illustrated in the drawings and hereinafter more fully described.

Figure 1 is a fragmentary diametral sectional view of a cover construction embodying the invention, certain parts being shown for convenience in elevation.

Figure 2 is a reduced rear elevational view of the rear cover construction of Figure 1.

Figure 3 is a bottom plan view of the toggle mechanism and associated structure of Figure 2.

Figure 4 is a view similar to the upper part of Figure 1 but shows a modified construction, said view being taken in substantially the plane designated by the line IV—IV in Figure 5.

Figure 5 is a view similar to Figure 2, but of the construction of Figure 4.

Figures 6 and 7 are views similar, respectively, to Figures 4 and 5, but show a modified form of the invention, Figure 6 being taken in the plane designated by the line VI—VI in Figure 7.

Figures 8 and 9 are views similar to Figures 4 and 5 respectively, but show another modification, Figure 8 being taken substantially in the plane designated by the line VIII—VIII in Figure 9.

Figure 10 is an enlarged fragmentary sectional view taken substantially in the plane designated by the line X—X in Figure 9, certain parts being shown for convenience in elevation.

Figure 11 is a rear elevational view of the rear cover mounting construction in accordance with still another form of the invention.

Figure 12 is a sectional view taken substantially in the plane designated by the line XII—XII in Figure 11, certain parts being shown for convenience in elevation.

Referring now more particularly to the drawings, there is illustrated a tire carrier A which may be mounted at the rear or either side or in any other suitable location on an automobile. The carrier A is preferably provided with an attaching flange B and with mounting studs C which are preferably permanently secured to the flange and project forwardly so as to pass through corresponding openings in the mounting collar D of the spare wheel hub E, so as to receive nuts and thereby properly support the wheel F from the carrier A.

In accordance with the present invention, the cover construction illustrated in Figure 1 includes a front plate-like member 1 formed to simulate in cross-section the front and tread portions of the spare wheel and tire, respectively, and preferably provided with a substantially central opening to receive the skirt of a false hub cap 2, so as to be releasably interlocked with the spring or other latches 3 of the cap 2. Adjacent its substantially central opening, the cover member 1 is provided with a substantially U-shaped reinforcing and mounting strap 4 whose bight 5 is projected rearwardly and provided with openings through which the studs C are adapted to project and receive attaching nuts 6 which serve to hold the wheel F and the strap 4 supported on the carrier A. The nuts 6 may be tightened up to such an extent as to prevent relative movement between the carrier A, the wheel F and the strap 4, although, if desired, additional bolts or studs (not shown) like the studs C may be provided to pass through additional openings (not shown) in the attaching collar D to receive additional nuts (not shown) of the character employed in fastening the wheel in automobile supporting position, such nuts having bevelled portions to fit in the countersunk openings in the collar D. The free ends of the arms 7 of the strap 4 extend away from each other and are preferably permanently united with the cover member 1 adjacent the central opening thereof at 8 as by welding, riveting, brazing or the like. The strap 4 is preferably of substantially thicker material than the material of which the cover member 1 is made, so as to withstand the pressure on the bight 5 resulting from tightening up of the nuts 6.

The rear cover member 9 is formed to cover that portion of the tread of the tire G which remains uncovered when the front cover member 1 alone is in position, and is provided with an outwardly projecting bead 10 arranged to be located substantially in the median plane of the tire and to have a reinforcing as well as an ornamental effect. The free margin 11 of the bead 10 projects forwardly and inwardly to fit within the inturned margin 12 of the cover member 1. The engaging marginal portions 11 and 12 are preferably formed transversely concavo-convex so that the margin 12 will nest within the margin 11, although the margin 12 is circumferentially outermost.

The rear cover member 9 is formed to also cover a portion of the rear wall of the tire G adjacent the tread thereof, and carries a bracket in the form of a spider 13 having an upwardly extending arm 14 and downwardly and inwardly extending arms 15 connected as by welding, riveting, brazing, or in any other suitable manner at 16 to the rear cover member 9.

The arms 14 and 15 preferably extend from the body or head 17 of the spider 13 approximately 120° apart, although this is merely illustrative since other arrangements may be found suitable. The arms 15 are flexible in the plane of the cover member 9, which is so constructed as normally to assume the contracted condition shown in dotted lines in Figure 2. When so contracted, the margins 11 and 12 may move telescopically free of each other. The toggle mechanism 18 is shown in full lines in Figure 2 in the position which results in an enforced expansion of the cover member 9 to the full lines. When so expanded, the arrangement of the mechanism 18 is such that the inherent tendency of the cover member 9 to contract enables said mechanism to prevent contraction to the dotted line position. When so expanded, the margin 11 is tightly engaged with the margin 12 as shown in Figure 1 whereby the cover members are interlocked. By pulling downwardly on the handle of the mechanism 18, the toggle mechanism is released and the ends 19 approach each other.

The body 17 of the spider 13 is provided with a plurality of stud openings 20 arranged to register with corresponding openings in the carrier flange B to enable the studs C to pass therethrough. A retaining plate 21 is located on the front face of the body 17 and is preferably permanently united as by welding or in any other suitable manner to the flange B to thereby mount the head 17 on the carrier A. The cover member 9 is thus so mounted on the carrier A, that when a wheel F is mounted as hereinbefore described, the wheel and cover member are substantially in coaxial relation.

When it is desired to dismount the spare wheel F, it is necessary to merely remove the cap 2 to thereby render the nuts accessible, and remove the nuts. Thereupon, the front cover member 1 and the wheel F may be removed, the rear cover member 9 having first been allowed to contract by manipulation of the toggle mechanism 18 so as to enable the margins 11 and 12 to be separated. The spare wheel and associated tire may be mounted in position without disturbing the rear cover member 9 and may be allowed to rest on the studs C or may be tightened in place by the other nuts above referred to, pending the application of the front cover member 1. Preferably after the studs C extend through the openings in the strap 4, the toggle mechanism 18 may be manipulated to expand the cover member 9 into interlocked relation to the front cover member 1, whereupon the cover structure in its entirety and the spare wheel and tire are properly mounted in place.

The bracket spider 13 is preferably of such construction as to be substantially form-retaining so as to properly support the rear cover member 9, yet is made sufficiently resilient to yield at its arms 15 in accordance with the expansion and contraction of the cover member 9.

A somewhat modified cover and bracket construction is shown in Figures 4 and 5, wherein the front cover member 22 is formed at its outer peripheral portion to extend rearwardly somewhat beyond the median plane of the tire G, terminating in a substantially concavo-convex circumferential bead 23. The rear cover member 24 is formed similarly to the rear cover member 9 previously described, its front margin terminating in a bead 25 similar to but arranged to be disposed within the bead 23. In the previously described form of the invention, it is noted that the toggle mechanism 18 is carried by brackets mounted at the ends of the bead 19. In the form of the invention appearing in Figures 4 and 5, due to the fact that the bead 25 is substantially entirely innermost, the toggle mechanism 18 is mounted rearwardly of the bead 25 so as not to interfere with the cooperation between the beads 23 and 25, and so that said beads will not interfere with the operation of the toggle mechanism 18.

When the rear cover member 24 is contracted, the outer periphery of its bead 25 is such as to readily clear the free marginal edge 26 of the bead 23 so as to allow the front cover member 22 to be readily applied to and removed from the rear cover member 24. When the rear cover member 24 is expanded by the toggle mechanism 18 as shown in Figure 5, the bead 25 is tightly nested within the bead 23 so that the cover members are interlocked.

The mounting bracket 27 for the rear cover member 24 includes a head or body 28 provided with openings 29 performing the same function as the openings 20 in Figure 2, the head 28 being mounted in the same way as the head 17. Extending from the head or body 28 in substantially the same relationship as shown in Figure 2, is an upper arm 30 and lower arms 31, the latter diverging so that said arms are approximately 120° apart. The ends of the arm 30 are preferably riveted at 32 or otherwise rigidly secured to the cover member 24 and the body 28. The arms 31 are pivotally connected as at 33 to the rear cover member 24. The inner ends of the arms 31 are joined to the body 28 by pin and slot connections 34 arranged to permit sufficient play between the arms or rods 31 and the body 28 to compensate for the expansion and contraction of the rear cover member 24.

In the form of the invention appearing in Figures 6 and 7, a rear cover member is dispensed with, the front cover member 35 extending rearwardly substantially entirely across the tread of the tire G and having its margin 36 extending inwardly and rebent to provide a smooth edge. The bracket structure for supporting the front cover member 35 includes a body 37 provided with openings 38 and mounted in the same way as the body 17 of the Figure 2. Extending vertically from the body 37 is a rod or arm 39 and downwardly diverging arms 40, said arms being preferably substantially 120° apart. The outer ends of the rods 39 and 40 are preferably welded at 41 to an expansible and contractible split band 42, the ends 43 of said band being located preferably intermediate the outer ends of the lower rods 40. Said ends carry a toggle mechanism 18 which is operated to forcibly expand the band 42 and may be collapsed to permit the band 42 to be contracted to the condition shown fragmentarily in dotted lines in Figure 7. The rods 39 and 40 are slender and resilient, the rods 40 being capable of expansion from their normal positions shown in dotted lines to the full line positions of Figure 7.

The band 42 is preferably concavo-convex with its concave surface outermost to provide a peripheral pocket 44 in which the marginal edge portion 36 of the front cover member 35 is adapted to be fitted. The rods 39 and 40 are preferably rigidly connected at their inner ends to the body 37 as by welding, riveting or the like at 45. The diameter of the forward edge 46 of the band 42 is normally less than that of the innermost periphery of the marginal portion 36 of the front cover member 35 so that when the band 42 is in its normal contracted condition, the band 42 and cover member 35 may be readily telescoped to enable the front cover member to be applied to and removed from the band 42. When the parts have been telescoped, the band may be expanded by manipulation of the toggle mechanism 18 so as to interlock with said marginal portion as shown.

In the form of the invention appearing in Figures 8 and 9, the front cover member 47 is of a form similar to the cover member 35 but, at its rear and inwardly turned margin 48, the cover member 47 is provided with a reinforcing ring 49 interiorly thereof. The mounting bracket structure comprises a spider 50 whose substantially centrally located body 51 is arranged forwardly as in the other forms of the invention and provided with stud openings 52 for the same purpose hereinbefore described. The spider 50 is provided with a pair of upwardly diverging arms 53 which are disposed in a plane rearwardly of the body 51, being bent at 54, each arm at its outer extremity being bent forwardly in the shape of a V at 53a and arranged to engage the rear edges of the marginal portion 48 and the ring 49 and the adjacent forwardly extending surface of the ring 49, so as to interlock with the portion 48 and ring 49.

The other arm 55 is likewise bent rearwardly at 54 so as to lie in substantially the plane of the arms 53 and carries an adjustable extension 56 whose outer end is formed to be substantially identical with the outer ends of the arms 53 and to cooperate with the marginal portion 48 and ring 49 in the same way. The extension 56 is provided with a longitudinal slot 57 and receives a headed pin 58 carried by the arm 55 so that the extension may be slidable relative to the arm 55 but not separable therefrom. The arm 55 also carries a stud 59 preferably permanently connected thereto and having a threaded shank 60 extending through the slot 57 and threadedly receiving a thumb nut 61 engageable with the rear surface of the extension 56 adjacent the slot and operable to tightly clamp the extension against the arm 55 in any desired position. Thus by loosening the nut 61 and sliding the extension 56 radially inwardly, the cover member 47 may be released and withdrawn from the bracket 50 by being first raised sufficiently to clear the V-shaped portions 53a and then withdrawn axially away from the tire. Similarly, the cover may be mounted on the bracket 50 by being first shoved over the tire so that the upper portion of the ring 49 will clear the forward ends 53b of the V-shaped portions 53a, whereupon the cover member 47 is permitted to descend sufficiently to enable the parts to cooperate as shown in Figure 8. With the parts thus arranged, the nut 61 may be loosened and the extension 58 slid outwardly into firmly clamping engagement with the lower part of the ring 49 as shown in Figure 9, so that when the nut 61 is thereafter tightened, the bracket 50 firmly supports the cover member 57.

It is thus evident that the bracket 50 is so formed as to accommodate cover members of different sizes. The cover member 47 is preferably made sufficiently enlarged to readily accommodate tires of different sizes and different conditions of wear, and so that the same may be raised and lowered sufficiently to cooperate with the upper arms 53.

A construction similar in operation to that disclosed in Figures 8, 9, and 10 is illustrated in Figures 11 and 12. The cover of this form of the invention is designated by the reference numeral 62 and is shaped to conform generally to the transverse contour of the tread and front of the spare wheel and tire. The cover member 62 may be formed centrally as shown in Figure 1, or may be made substantially imperforate as shown in Figure 12. This is likewise true of the front cover members of the other forms of the invention hereinabove described.

The cover member 62 is formed to cover the front of the spare wheel and tire and to extend substantially entirely across the tread thereof and is provided in planes arranged to be disposed adjacent the planes of the front and rear edges of the tread with peripheral outwardly extending reinforcing and ornamental beads 63 and 64. The bracket structure for supporting the front cover member 62 is shown generally at 65 and comprises a generally U-shaped body 66, whose bight 67 is projected forwardly and provided with stud openings 68 to receive the upper studs C and be permanently secured thereto in much the same manner in which the corresponding structures of the previously described forms of the invention are secured to the carrier A. The member 66 has its rear portions 69 extending in opposite directions along a line which forms a chord of the circle of the bead 64 at the rear of the cover member 62. Bracket extension arms 70 are positioned in sliding arrangement with and at the rear of the portions 69 of the body 66 and are provided with slots 71 in which the pins 72 of the portions 69 are received. The elements 70 are provided with rearwardly extending arms 73 in which the oppositely threaded ends of the turnbuckle 74 are threadedly received. By rotating the buckle 74, which is provided with angular surfaces for receiving a wrench or the like, the elements 70 may be moved longitudinally outward or inward as desired, the pins 72 preventing separation of the elements 70 from the body 66.

An arcuate latch piece 75 is preferably rigidly connected at 76 to the outer end of each element 70 so as to be disposed substantially diametrically opposite each other. The pieces 75 are shaped to conform to the interior of the bead 64 and may be thrust outwardly to engage within the bead 64 and become interlocked therewith to thereby afford a substantially rigid support of the front cover member 62 from the bracket structure 65. By retracting the elements 70 the cover member 62 may be free to be withdrawn.

The ends of the turning member 74 may be upset or otherwise formed to prevent separation from the parts 73. Preferably also, the free end of the stud shank 60 of Figure 10 may be upset or otherwise formed to prevent separation of the thumb nut 61 therefrom.

The cover members of the various forms of the invention hereinabove described are preferably formed of any suitable form-retaining material such as sheet metal, hard rubber, rubber composition, fiber or phenolic condensation product, sheet metal having been found satisfactory for this purpose. The bracket structure embodies elements which may be readily stamped out or otherwise formed without special machining operations, so that the structure as a whole is rather simple, and may be made at a low cost of manufacture. In the form of the invention appearing in Figures 1, 2, and 3, the toggle mechanism 18 is arranged inconspicuously, and this is also true of the form of the invention appearing in Figures 4 and 5. In the form appearing in Figures 6 and 7, the toggle mechanism 18 is substantially hidden from view since it is arranged inwardly of the outer periphery of the cover and is disposed on the side adjacent the automobile.

In the forms of the invention appearing in Figures 8 to 12, inclusive, the manipulating and mounting means is all disposed inwardly of the outer periphery of the cover and at the rear so as not to be visible when the cover is mounted in proper wheel and tire covering position.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a device for covering a spare tire on a spare wheel adapted to be mounted on a spare wheel carrier, a member formed to cover the front and extend rearwardly over the tread of the tire, terminating in an inwardly extending margin, an expansible and contractible ring which is concave outwardly to provide a peripheral recess for receiving said margin, said ring being normally contracted to clear said margin, a plurality of arms connected to and extending inwardly from said ring, and mounted on the carrier to support the ring therefrom, said member being relatively circumferentially rigid so that when the ring is expanded, said member cannot be released therefrom.

2. In a device for covering a spare tire on a spare wheel adapted to be mounted on a spare wheel carrier, a member formed to extend rearwardly across the tire, a plurality of arms mounted on the carrier, means for supporting said member centrally of the wheel so as to hold it in centered position on the tire, said arms and the member being constructed and arranged to interlock when desired, and means for adjusting at least one of said arms toward and away from said member to selectively lock and release said member.

3. In a device for covering a spare tire on a spare wheel adapted to be mounted on a spare wheel carrier, a member formed to extend rearwardly across the tire, a plurality of arms mounted on the carrier, means for supporting said member centrally of the wheel so as to hold it in centered position on the tire, said arms and the member being constructed and arranged to interlock when desired, and means for adjusting at least one of said arms toward and away from said member to selectively lock and release said member, said one arm comprising relatively movable sections, and means preventing separation of said sections.

4. In a device for covering a spare tire on a spare wheel adapted to be mounted on a spare wheel carrier, a member formed to extend rearwardly across the tire, opposed arms mounted on the carrier, means for supporting said member centrally of the wheel so as to hold it in centered position on the tire, said arms and the member being constructed and arranged to interlock when desired, and means for adjusting said arms toward and away from said member to selectively lock and release said member.

5. In a device for covering a spare tire mounted on a spare wheel, front and rear cover members formed to cover adjacent portions of the tire, one of said members having a peripheral reinforcing bead arranged at substantially the median plane of the tire and providing between the bead and the edge of said one member an expansible and contractible portion having a peripheral recess, the other member having a portion formed to be nested in said recess, the first portion being contractible to permit free telescopic movement between said portions, and expansible, when said portions are telescoped, to nest said portions.

6. In a device for covering a spare tire and a spare wheel, front and rear cover members formed to cover adjacent portions of the tire, one of said members having a peripheral bead arranged at substantially the median plane of the tire and providing with the other member portions formed to be nested, one of said portions being resilient and contractible to permit free telescopic movement between said portions, and expansible, when said portions are telescoped, to nest said portions.

7. In a device for covering a spare tire and a spare wheel, front and rear cover members formed to cover adjacent portions of the tire, one of said members having a peripheral bead arranged at substantially the median plane of the tire and providing with the other member portions formed to be nested, one of said portions being resilient and contractible to permit free telescopic movement between said portions, and expansible, when said portions are telescoped, to nest said portions, the other of said portions being circumferentially relatively rigid, whereby said members are not releasable without contracting the resilient portion.

8. In a device for covering a spare tire and a spare wheel adapted to be mounted on a spare wheel carrier, front and rear cover members formed to cover adjacent portions of the tire, one of said members having a peripheral bead arranged at substantially the median plane of the tire and providing with the other member portions formed to be nested, one of said portions being resilient and contractible to permit free telescopic movement between said portions, and expansible, when said portions are telescoped, to nest said portions, and means for mounting the front member on the carrier independently of the rear member.

9. In a device for covering a spare tire and a spare wheel adapted to be mounted on an automobile, front and rear cover members formed to cover adjacent portions of the tire, one of said members having a peripheral bead arranged at substantially the median plane of the tire and providing with the other member portions formed to be nested, one of said members being resilient and contractible to permit free telescopic movement between said portions, and expansible, when said portions are telescoped, to nest said portions, and attaching means flexible in a plane parallel to the plane of the resilient member for mounting the resilient member in proper tire protecting position so as not to interfere with expansion and contraction of said resilient member.

10. In a device for covering a spare tire and a spare wheel, front and rear cover members formed to cover adjacent portions of the tire, one of said members having a peripheral bead arranged at substantially the median plane of the tire and providing with the other member portions formed to be nested, one of said portions being resilient and inherently contractible to such an extent as to permit free telescopic movement between said portions, and means for expanding said resilient portion when said portions are telescoped, to nest said portions, said means being constructed and arranged to be rendered effective, by the inherent contractive characteristics of the resilient portion, to prevent contraction of said resilient portion.

11. In a device for covering a spare tire on a spare wheel adapted to be mounted on a spare wheel carrier, a member formed to cover the front and extend rearwardly over the tread of the tire and having a peripheral inwardly extending portion, expansible and contractible support means recessed outwardly for receiving said portion, said means being contractible to clear and expansible to receive said portion, and spring means resiliently mounting said support means on the carrier.

12. In a device for covering a spare tire on a spare wheel adapted to be mounted on a spare wheel carrier, a member formed to cover the front and extend rearwardly over the tread of the tire and having a peripheral inwardly extending portion, expansible and contractible ring means for receiving said portion, said ring means being contractible to clear and expansible to receive said portion, a plurality of arms connected to and extending inwardly from said ring means, and mounted on the carrier to support the ring means therefrom, said arms being resilient in a plane parallel to the plane of the ring means so as not to interfere with expansion and contraction of the ring means.

13. In a device for covering a spare tire on a spare wheel adapted to be mounted on a spare wheel carrier, a front cover member formed to extend rearwardly over the tire, means for supporting said member centrally of the wheel so as to hold it in centered position on the tire, a plurality of arms mounted on the carrier and having portions interlockable with said member, and means for adjusting at least one of said arms toward and away from said member to selectively lock and release said member, said arms and adjusting means being arranged rearwardly of and within the outer periphery of the member so as to be shielded thereby when the member is in proper tire covering position.

14. In combination, a wheel having a tire thereon, a support therefor, a spare tire cover having a portion disposed over an outer side wall of the tire and having a portion projecting over the tire tread, means for supporting said cover centrally of the wheel so as to hold the cover in centered position on the tire, and retaining means disposed on the rear side of the tire for holding said cover on the tire including an arm supported inwardly of the tire and having an outer portion detachably associated with the rear edge of said cover portion, said arm being movable inwardly and outwardly relative to said cover edge to enable application and removal of the cover with respect to the tire, said cover being removable from the outer side of the tire when said arm portion is detached therefrom.

15. In a device for covering a spare tire on a spare wheel adapted to be mounted on a spare wheel carrier, a member formed to extend rearwardly across the tire, a plurality of arms mounted on the carrier and affording a three point support for said member, means for supporting said member centrally of the wheel so as to hold it in centered position on the tire, said arms and the member being interlockable at will, and means for adjusting one of said arms toward and away from said member to selectively lock and release said member.

16. In a device for covering a spare tire on a spare wheel adapted to be mounted on a spare wheel carrier, a member formed to cover a part of the tire, means for supporting said member centrally of the wheel so as to hold it in centered position on the tire, a plurality of arms mounted on the carrier and having portions interlockable with said member, and means for adjusting at least one of said arms toward and away from said member to selectively lock and release said member.

17. In a device for covering a spare tire on a spare wheel adapted to be mounted on a spare wheel carrier, a member formed to cover a part of the tire, means for supporting said member centrally of the wheel so as to hold it in centered position on the tire, a plurality of arms mounted on the carrier and having portions interlockable with said member, and a single adjusting means for adjusting said arms toward and away from said member to selectively lock and release said member.

GEORGE ALBERT LYON.